(No Model.)
C. H. ROHDE.
COMBINED CLUTCH AND BRAKE.
No. 278,601. Patented May 29, 1883.
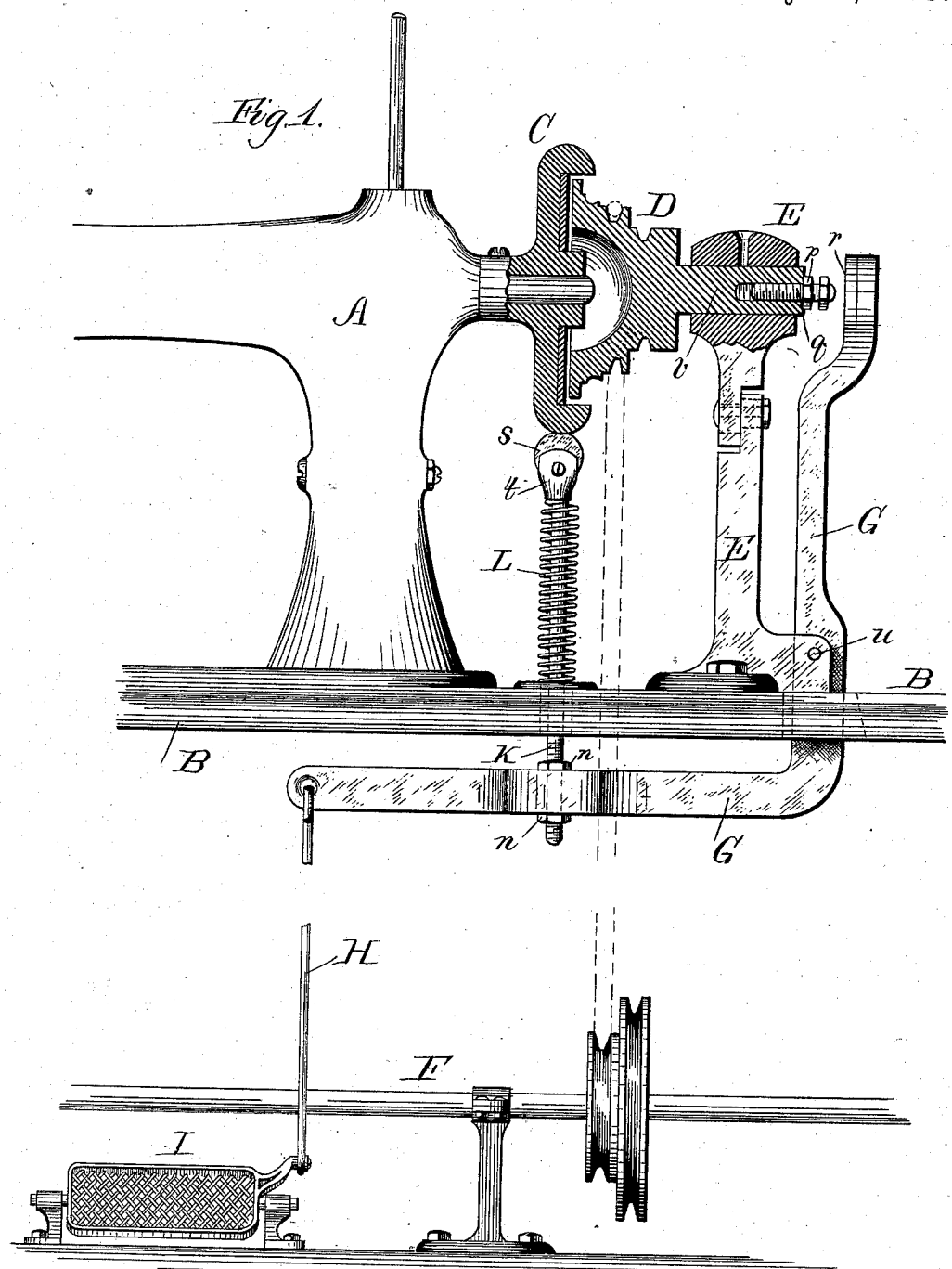

UNITED STATES PATENT OFFICE.

CONRAD H. ROHDE, OF HUMBOLDT PARK, ILLINOIS.

COMBINED CLUTCH AND BRAKE.

SPECIFICATION forming part of Letters Patent No. 278,601, dated May 29, 1883.

Application filed February 23, 1883. (No model.)

*To all whom it may concern:*

Be it known that I, CONRAD H. ROHDE, a citizen of the United States, residing at Humboldt Park, in the county of Cook and State of Illinois, have invented a new and Improved Combined Clutch and Brake for Sewing-Machines; and I hereby declare the following to be a full, clear, and exact description of the same.

My invention relates to a device to be attached to sewing-machines run by power, which shall act alternately as a clutch and brake for the driving-wheel of the machine, the device being controlled by means of a treadle, the pressing down of which causes the clutch to bear against the driving-wheel and release the brake, and the releasing of which causes the brake to bear against the wheel, but releases the clutch.

The object of my invention is to construct such a device with the smallest practicable number of parts, and to arrange these in the most practical manner for convenient and effective operation.

The nature of my invention will be clearly understood from the following description, reference being had to the accompanying drawings, of which—

Figure 1 is a side elevation of my device, partly in section; and Fig. 2, a detail view.

A is the arm of the machine, mounted upon the table B, and carrying the driving-wheel C, provided with a friction-washer, $w$; and D, the friction-clutch, mounted in a standard, E, also upon the table B, by means of a horizontal spindle, $v$, passing through the upper end of the standard. This clutch comprises a wheel having an annular face to bear against the adjacent side of the driving-wheel, and is operated by a belt, (indicated by dotted lines in the drawings,) connecting it with a pulley on the driving-shaft F below the table. Any suitable construction may be employed as to the contact-surfaces of the wheel C and clutch D; but the one shown answers the purpose satisfactorily.

G is a bent lever passing vertically down through the table B, and then horizontally under the table to a point below the arm A, and fulcrumed to the standard E near its lower end, as shown at $u$. The lower end of the lever G is connected by means of a rod, H, to the treadle I.

K is a rod extending upward from a point in the lever G in line with the driving-wheel C. This rod passes through the table B, and has at its upper end a head, $t$, to which is secured the brake $s$.

L is a helical spring surrounding the rod K between the top of the table and the head $t$, and tending to hold the brake $s$ against the wheel. While this arrangement of the spring is preferred, it is obvious that it might be placed in other situations without changing its function—as, for example, between the table and the lever, or between the standard and the lever.

The upper arm of the lever G extends high enough to be in line with the spindle $v$, and is there provided with a rawhide face, $r$. Since the spindle turns against this face, it is obvious that the point of contact should be as small as practicable to avoid friction. I accomplish this, and also provide means for adjusting the length of the spindle, by inserting the screw $q$ into the end of the spindle. By turning this screw its head may be brought into such proximity with the lever as the circumstances require. It is stayed and rendered firm by means of the nut $p$, screwed against the end of the spindle.

In order to give facility in adjusting the lever G and rod K to each other, I provide the lever with a long slot, $o$, at about the point where it should connect with the rod. The lower end of the rod passes through this slot, and is screw-threaded and secured to the lever by a nut, $u$, above and below. With this construction and the provision for adjustment of the spindle $v$ above described no particular nicety is required in the matter of pivoting the lever at its fulcrum to the standard E.

It is advisable to provide the standard E with a capability of adjustment higher or lower, to accommodate it to the height of the machine. For this purpose any suitable adjusting device may be employed—as, for example, that represented in the drawings, where the standard is shown in two parts, which are slotted, and are held together by a set-screw, $m$, passing through the slots, as indicated by the dotted lines.

From the foregoing description it will be seen that when it is desired to start the machine it is only necessary to press down the treadle I with the foot. This, through the medium of the rod H, draws down the lower end of the lever G, and with it the brake-rod K, in apposition to the spring L. At the same time the upper end of the lever is thrown forward against the end of the spindle of the clutch D, thus forcing the latter against the driving-wheel C. This condition of things continues so long as the treadle is held down. When, therefore, it is desired to stop the machine, the treadle is released, when the reaction of the spring L carries the lower end of the lever G up and the upper end away from the spindle, thus releasing the clutch, while at the same time the brake is thrown upward against the driving-wheel.

What I claim as new, and desire to secure by Letters Patent, is—

In combination with the arm A and driving-wheel C of a sewing-machine, and with the table B, the friction-clutch D, having the spindle $v$, provided with a screw, $q$, and nut $p$, standard E, made adjustable as to height, mechanism for revolving the clutch D, bent lever G, having its fulcrum near the base of the standard, and provided with the slot $o$, brake-bar K, provided at its upper end with a brake, $s$, and threaded toward its lower end, nuts $u$ $u$, securing it in place within the slot $o$, spring L, treadle I, and connecting-rod H, substantially as described.

CONRAD H. ROHDE.

In presence of—
   C. C. LINTHICUM,
   W. S. BATES.